UNITED STATES PATENT OFFICE.

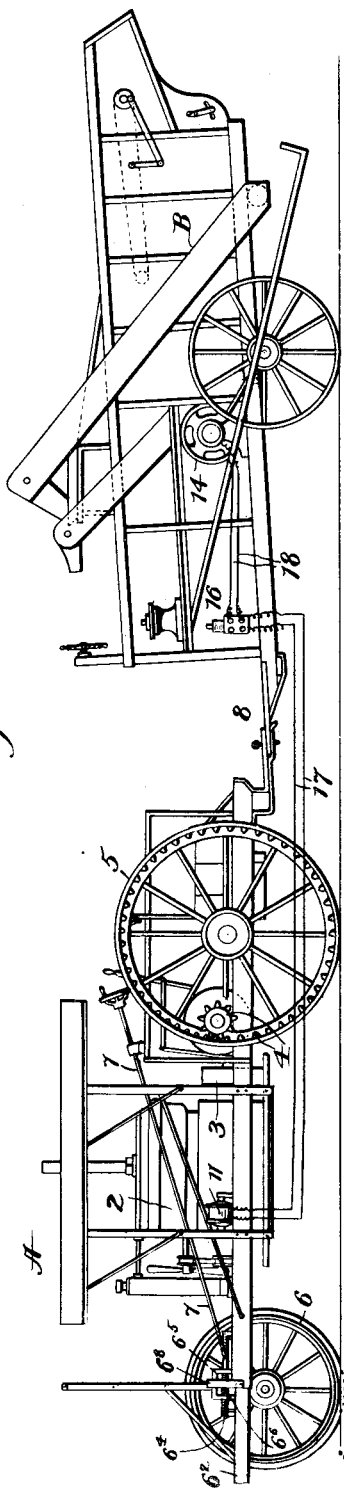

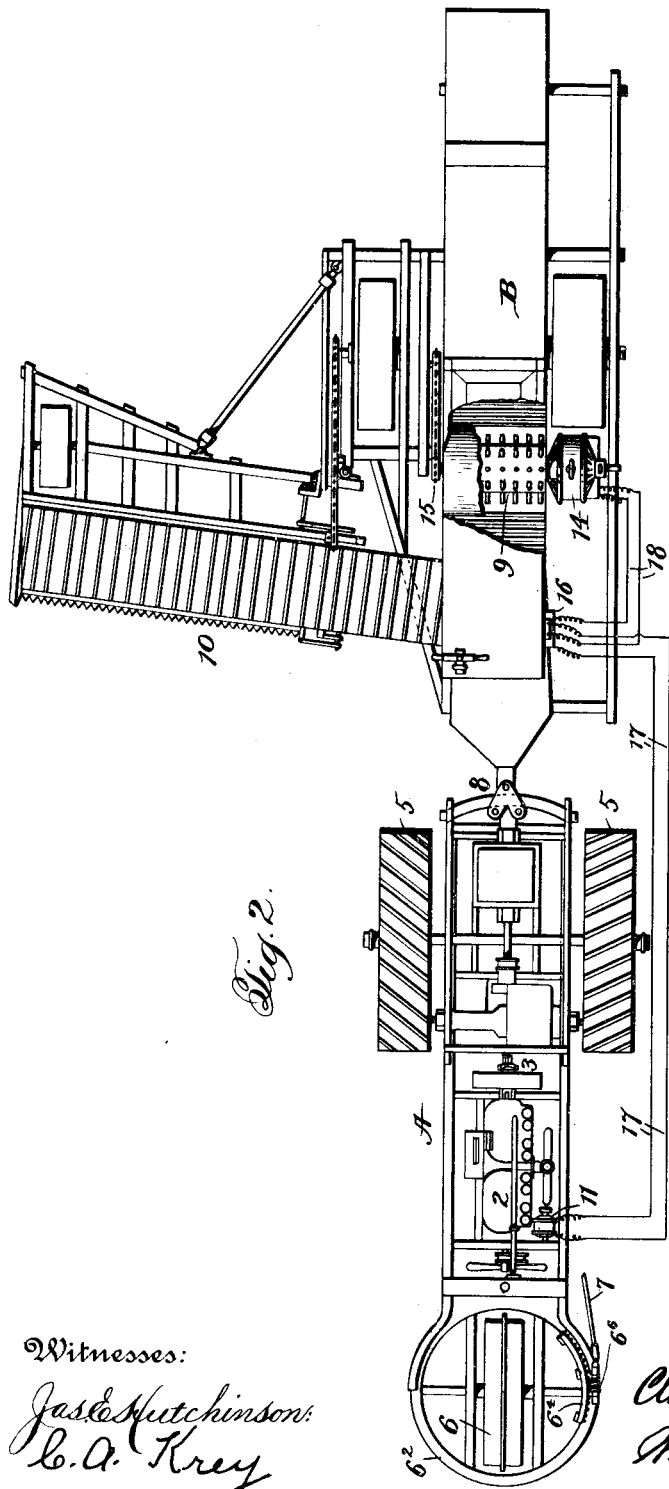

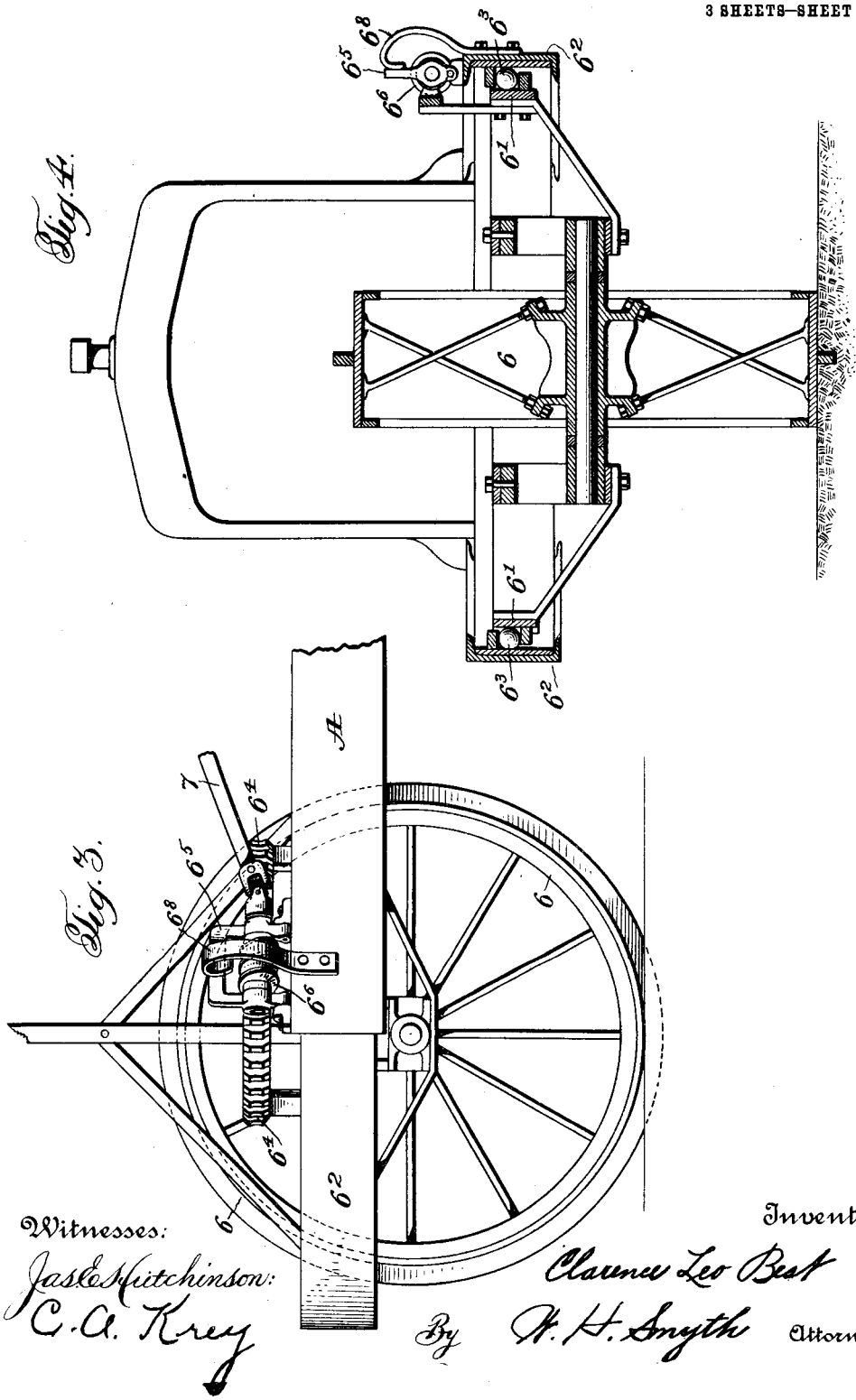

CLARENCE LEO BEST, OF SAN LEANDRO, CALIFORNIA.

HARVESTER.

1,064,812.   Specification of Letters Patent.   Patented June 17, 1913.

Application filed October 28, 1911. Serial No. 657,261.

*To all whom it may concern:*

Be it known that I, CLARENCE LEO BEST, citizen of the United States, residing at San Leandro, in the county of Alameda and State of California, have invented certain new and useful Improvements in Harvesters, of which the following is a specification.

My invention relates to harvesting machines adapted to operate in localities where grain ripens and cures on the stalk, that is to say, reaches a condition permitting it to be cut, threshed and cleaned simultaneously.

The object of my invention, stated generally, is to provide a combined harvester and driving means capable of working economically and uniformly anywhere that a combined harvester may be used, and a special object thereof is to meet and provide for the difficulties of power harvesting on freshly reclaimed lake and river bottom lands, particularly those large and exceptionally fertile areas gained to tillage by natural recession and artificial reclaiming by diking around Tulare Lake in this State.

The difficulties incident to the specific object of my invention are many and exceedingly great, in addition to those inherent in the more general one of power harvesting—so great indeed as to have prevented heretofore, the employment of combined harvesters on much of the richest of this land.

To the end therefore of accomplishing the general or specific objects of my invention, I have combined in a harvester, instrumentalities so organized and arranged as to introduce the novel, extremely useful and heretofore unattainable results, functions and effects which permit of and provide for the cutting, cleaning and threshing mechanisms being maintained at the most efficient speed and with ample power, whether the grain is light, or heavy, and independent of the speed of travel of the machine. That is to say, the machine will travel about the field and will accelerate its motion for light grain and slow up for heavy grain and also be able to stop and thresh when the grain is lodged or what is known as "down-grain." And I have provided in these instrumentalities for the novel function and capability of overload to meet and provide for extraordinary drafts of energy, arising from encountering exceptionally heavy, luxuriant patches of grain, to deal with which would overtax the power of the machine using ordinary traction motive power. And in addition I have provided constructions and arrangements in the machine which avoid and eliminate choking of the sickle bar, through the lagging and surging thereof, heretofore unavoidably brought about by the character of the steering devices employed.

In addition to the foregoing, I have provided, selected and arranged instrumentalities which avoid all danger of fire, heretofore a source of serious loss and danger. Finally the methods, mechanisms and provisions inherent and associated in my combined harvester, bring about considerable reduction in weight, cost of construction, upkeep and expense of operation, with increase of effectiveness, range of work and gross economy.

One form of the means, methods, instrumentalities and their combination and arrangement, whereby my invention may be utilized and made effective, will now be fully described, reference being had to the accompanying drawings in which—

Figure 1 is a side elevation; Fig. 2 is a plan view with parts broken away; Fig. 3 is a side elevation of the steering gear on an enlarged scale; Fig. 4 is a section of the steering gear transverse to Fig. 3.

A represents a gasolene or gas traction engine having an internal combustion engine 2 with suitable driving connections, as the clutch 3 and gear train 4, for driving the traction wheels 5.

6 is a front steering wheel, equipped with my lost motion or slack eliminating connections. These connections may consist of a rotatable circular frame 6' (Figs. 3 and 4) in which is journaled the steering wheel 6. Frame 6' is concentrically associated with a suitable non-rotatable frame $6^2$, securely attached to the main frame of the traction engine A. Between the two circular frames are provided ball bearings $6^3$. Rigidly attached to the rotary frame 6' is an arc segmental gear $6^4$ concentric thereto. Hinged to the main frame of the traction engine on the stationary frame $6^2$ is a yoke $6^5$ provided with a worm pinion $6^6$ journaled in the yoke $6^5$ and meshing with the arc shaped rack or gear $6^4$. A handle 7 extending from the worm to any suitable location on the traction engine is provided to operate the worm. A spring 6⁸ of any suitable form is shown in the present instance as a flat curved spring, one end of which is secured to the traction engine frame, and its other end bearing with pressure upon the hinged yoke 6⁵, to keep the worm pinion 6⁶ snugly into operative contact with the rack 6⁴.

I will not claim the foregoing mechanism herein in view of the fact that it more properly constitutes subject matter for a divisional application.

B is a combined harvester suitably coupled to the traction engine by the draw bar 8; the harvester being adapted to be drawn about the field by the traction engine A. The combined harvester is provided with the usual cleaning cylinder 9 and header 10.

11 is a dynamo or electric generator mounted on the traction engine and also driven direct from the gas engine 2 by suitable connections. The clutch 3 permits the gas engine and dynamo 11 to be run constantly, whether the machine is going fast or slow, or standing still.

When the clutch 3 is thrown in, the engine will drive both the traction engine and the dynamo. By this or equivalent form of connection between the engine and dynamo and engine and driving wheels 5 of the traction engine, it permits the dynamo to be operated at uniform speed, independent of whether the traction engine is moving forward or not, and if desired the connections 4 may be of the variable speed type so as to permit the gas engine to be driven at different speeds. However, at all times there will be sufficient current generated by the dynamo 11 to operate a suitable motor 14 on the harvester frame and to operate the cylinder 8, and also the cutting mechanism 10, at uniform speed. In other words, by the form of gas electrical drive and control hereinbefore provided, the harvester is able to travel about the field slow or fast, or to stop, and still thresh and clean the grain.

I prefer to mount the motor 14 directly on the shaft of the cylinder 8 because the speed of the motor corresponds approximately to the speed at which the cylinder should be operated. However, any other form of connection drive would be suitable. The cutting mechanism 10 may be operated through suitable gearing chains 15 from the cylinder, or if desired, a separate motor may be mounted on the header frame. In fact this gas electric combined traction harvester affords an excellent opportunity for a number of units upon the harvester, for electric lighting, etc., thus doing away with a quantity of chain and gearing which otherwise would occasion more or less trouble and waste power. The operation of the cleaning and cutting mechanism on the harvester frame is controlled from a suitable switch or variable speed controller 16, conveniently located, preferably on the harvester frame as shown; this controller 16 having wires 17 running to the terminals of the dynamo and other wires 18 properly connecting it with the motor 14. By means of the controller 16 the operation of the heading and threshing mechanism can be controlled to a nicety, according to the nature of the grain being threshed. While ordinarily the cylinder and cutting mechanisms will operate at constant speed, nevertheless, under some conditions of the ground or grain it might be desired to accelerate or otherwise vary the speed of these parts within certain limits without changing the speed of the traction engine, due, for instance, to running into a short patch of very heavy or very thin grain. This variation in the speed of the cylinder and cutting mechanism can be effected by the man at the controller 16.

The electric wires 17—18 run from the dynamo to the motor and form a light, flexible power transmitting connection to bridge the gap between the traction engine and harvester frame, and avoid all the difficulties heretofore present in the use of steam and mechanically driven machines. With my machine the motion of the cylinder and cutting mechanism will remain absolutely uniform, irrespective of the nature of the ground or the irregularity of the strains, pulls and jolts put on either the traction engine or the harvester frame. It is also to be observed in my new machine, that when the traction engine frame is at a standstill the gas engine is unclutched, and the whole power produced by it may be transmitted to the electric dynamo to generate a maximum of electric energy from one hundred (100%) to two hundred (200%) per cent. beyond the normal capacity for utilization in running the motor to enable the latter to take care of sudden unexpected overloads cast upon the cutting, threshing and cleaning mechanisms. This is a result, function and effect which from actual experience, I know has never before been provided for or accomplished.

Thus the stated objects of my invention are accomplished in practice by the method and means disclosed herein because:—The cutting, threshing and cleaning mechanisms are independently under control as to speed, while the whole of the apparatus is traveling forward at a uniform rate. By this combination of devices a uniform speed may be maintained upon the cutting, threshing and cleaning mechanisms under all variations of progressive motion. A uniform speed of cutting, threshing and cleaning mechanism may be kept up with wide variation of power or overload and the progressive speed of the machine maintained at uniform or variable rate. The threshing and cleaning mechanisms may perform their functions at their most efficient speed, while the traction device is stationary. Choking of the sickle bar is avoided by the character of the steering mechanism, which insures a steady forward motion by the elimination of surging and also by the capability inherent in this invention of applying to the cutter of the sickle additional speed and power to meet excessive demands or overload. Overload of the threshing and cleaning mechanism is provided for by surplus energy made available by the instrumentalities combined in my invention. The device being extremely light owing to the inherent nature of the power generating and distributing devices is available to operate on loose friable surfaces where tractive capability is low. This invention is easily and cheaply applicable to the several thousand horse drawn harvesters now in use on this coast, and thus does away with this expensive and inefficient traction method. It economizes operations in the matter of labor, fuel and water, with added scope and reliability, and extends the employment of combined harvesters into territory heretofore inaccessible. The fire hazard is eliminated by the absence of open fire places and of flying sparks and dropping incandescent particles. All of these novel and highly important results functions and effects flow from the interaction of simple devices combined and unified in the light compact and practical machine herein illustrated which machine has successfully stood the test of practical commercial operation.

Many changes from the form, proportions and arrangements of the parts may be made in the above described illustration of my invention without departing from its principle or essence. The internally fired engine though an efficient and satisfactory motor for the purpose, being light, powerful, compact and non-fire-hazardous is not of the essence of my invention but only a convenient element therein for any other motor possessing similar characteristics might also serve. The dynamos are not of the essence being only convenient means of generating and distributing power throughout the machine at will in quantities to suit the requirements. And so with the other described element. But the invention itself is of much broader scope than the physical organization herein used to illustrate it as it for the first time presents in useful and practical form unified instrumentalities, the combination of which so interact as to produce the capabilities, functions and effects desirable and necessary for the solution of the problems set out to be accomplished and heretofore unsolved and the attainments of the objects hereinbefore mentioned and the production of a unitary organized machine for harvesting grain under the adverse condition under which it grows in fertile, reclaimed lake and river bottom lands. I therefore desire to claim this invention broadly unrestricted to details of construction.

I claim:—

In a combined traction and harvesting machine of the character described, the combination with harvesting apparatus including a cutter bar or sickle and threshing instrumentalities, and a vehicle therefor, of a separate traction vehicle flexibly coupled to the harvester vehicle, a gas engine on the traction vehicle directly operating the traction mechanism, means for coupling and uncoupling the traction mechanism and the engine, an electric generator on the traction vehicle driven by the engine, separate and independent means connecting the generator with the engine so that the generator may be operated when the traction mechanism is inoperative, an electric motor supported on the harvester vehicle and from which the said harvesting apparatus is directly operated, conducting means extending from the generator on the traction vehicle to the motor on the harvester vehicle and flexibly spanning the gap between said vehicles, and a controller for the motor interposed in said conducting means and mounted on the harvester vehicle for varying the action of the cutter, substantially as described.

In testimony whereof I have signed my name to this specification in the presence of two subscribing witnesses.

CLARENCE LEO BEST.

Witnesses:
M. D. CHAMBERLIN,
V. H. WILSON.